United States Patent
Neumann et al.

(10) Patent No.: US 6,745,037 B1
(45) Date of Patent: Jun. 1, 2004

(54) METHOD OF PROTECTING A LIMITED LOCAL AREA AGAINST ELECTROMAGNETIC RADIATION EMITTED BY MOBILE RADIO TERMINALS, RADIO STATION AND MOBILE RADIO TERMINAL

(75) Inventors: Peter Neumann, München (DE); Jörg Sasse, München (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/521,501

(22) Filed: Mar. 9, 2000

(30) Foreign Application Priority Data

| Sep. 9, 1997 | (DE) | ......... 197 39 483 |
| Nov. 26, 1997 | (DE) | ......... 197 52 405 |

(51) Int. Cl.[7] .............................. H04Q 7/20
(52) U.S. Cl. .............. 455/456.1; 455/456.2; 455/422.1; 455/411
(58) Field of Search ............... 455/441, 449, 455/457, 421, 411, 456, 461, 422.1; 370/342

(56) References Cited

U.S. PATENT DOCUMENTS

| 5,010,330 | A | * | 4/1991 | Snowden et al. ...... 340/825.21 |
| 5,539,925 | A |   | 7/1996 | Yli-Kotila et al. |
| 5,778,304 | A | * | 7/1998 | Grube et al. ................ 455/422 |
| 5,970,395 | A | * | 10/1999 | Weiler et al. ............... 455/67.3 |
| 6,343,213 | B1 | * | 1/2002 | Steer et al. ................. 455/411 |
| 6,434,399 | B1 | * | 8/2002 | Kamperschroer ........... 455/524 |
| 6,438,385 | B1 | * | 8/2002 | Heinonen et al. ........... 455/501 |
| 6,490,455 | B1 | * | 12/2002 | Park et al. ................ 455/456.4 |

FOREIGN PATENT DOCUMENTS

| DE | 44 33 613 A1 | 4/1995 |
| DE | 195 38 694 A1 | 4/1997 |
| DE | 297 09 099 | 10/1997 |
| DE | 197 30 595 C1 | 11/1998 |
| EP | 0 505 106 A2 | 9/1992 |

OTHER PUBLICATIONS

Published International Application No. 97/49255 (Heinonen et al.), dated Dec. 24, 1997.
Published International Application No. 90/01855 (Price et al.) dated Feb. 22, 1990.
Japanese Patent Abstract No. 08065413A (Takashi), dated Mar. 8, 1996.

* cited by examiner

*Primary Examiner*—William Trost
*Assistant Examiner*—Danh Le
(74) *Attorney, Agent, or Firm*—Laurence A. Greenberg; Werner H. Stemer; Ralph E. Locher

(57) ABSTRACT

In an area to be monitored, first signaling information is deliberately emitted to synthetically create conditions which force the mobile radio terminals that are to be detected to transmit second signaling information as a reaction. The second signaling information is then processed in order to detect mobile radio terminals which are not switched off.

17 Claims, 3 Drawing Sheets

METHOD OF PROTECTING A LIMITED LOCAL AREA AGAINST ELECTROMAGNETIC RADIATION EMITTED BY MOBILE RADIO TERMINALS, RADIO STATION AND MOBILE RADIO TERMINAL

CROSS-REFERENCE TO RELATED APPLICATION

This is a continuation of copending International Application PCT/DE98/02631, filed Sep. 7, 1998, which designated the United States.

BACKGROUND OF THE INVENTION

Field of the Invention

The invention relates to a method for protection of a limited local area against electromagnetic radiation, in particular the electromagnetic radiation that occurs when a mobile radio terminal is transmitting. The invention further relates to a radio station and to a mobile radio terminal.

Modern cellular mobile radio systems, such as the popular GSM system, are comprised of a large number of mobile switching centers that are networked to one another and produce access to a fixed network PSTN. Furthermore, the mobile switching centers are each connected to at least one base station controller. Each base station controller is in turn connected to at least one base station (base transmitting/receiving station). Such a base station is a radio station which can set up a radio link to other radio stations, so-called mobile stations (mobile radio terminals) via a radio interface.

For the purposes of this application, the term radio station also covers a base station, a (mobile radio) transmitting/receiving device, a base transmitting/receiving station, and a radio station which at least partially operates on the principle of a base transmitting/receiving station for one or more mobile radio systems and has appropriate transmitting, receiving and processing devices.

The physical transmission resources for the radio path are assigned to logic mobile radio channels in accordance with a defined scheme and using a multiple access method such as a TDMA, FDMA, or a CDMA method. In principle, there are two types of logic mobile radio channel: signaling channels for transmitting signaling information, and traffic channels for transmitting wanted data, i.e. useful data. The logic mobile radio channels may be assigned to a specific link between a base station and a mobile station. Data can be transmitted between the mobile stations and the base station associated with these mobile stations by means of radio-frequency electromagnetic waves.

In many cases, this may be undesirable, particularly if these electromagnetic waves can interfere with other sensitive electronic equipment. For example, it is possible for the complex electronics in modern aircraft to be interfered with by the use of mobile telephones by passengers flying in the aircraft, which may lead to difficulties in controlling the aircraft. Some airlines and regulatory agencies therefore ban the use of mobile telephones. Currently, passengers are made aware of these dangers by a corresponding announcement and they are requested not to use their mobile telephones. In most cases the mobile telephones are then switched off manually by the mobile-telephone users. This prior art procedure is very complex and, naturally, quite unreliable.

SUMMARY OF THE INVENTION

It is accordingly an object of the invention to provide a method of protecting a limited local area against electromagnetic radiation emitted by mobile radio terminals, a corresponding radio station and a mobile radio terminal, which overcome the above-mentioned disadvantages of the heretofore-known devices and methods of this general type and which allows a limited local area to be protected against electromagnetic radiation in a simple, efficient and reliable manner.

With the foregoing and other objects in view there is provided, in accordance with the invention, a method of protecting a limited local area against electro-magnetic radiation emitted by mobile radio terminals, which comprises:

emitting signaling information with a transmitting device about a location area associated with the transmitting device;

causing, upon a reception and processing in a mobile radio terminal, an emission of second signaling information for updating the location area of the mobile radio terminal;

receiving the second signaling information with a receiving device; and processing the second signaling information for detecting mobile radio terminals that are not switched off.

The invention is accordingly based on the idea of deliberately emitting signaling information in the area to be monitored in order to synthetically create conditions which force the mobile radio terminals to be detected to transmit signaling information, and processing of this signaling information leads to detection of mobile radio terminals which are not switched off.

If a radio station transmits signaling information over the location area associated with the radio station, whose reception and processing in a mobile radio terminal forces signaling information to be emitted in order to update the location area, then it is possible for mobile radio terminals which are not switched off to be actively required to emit signaling information by means of which they can easily be detected. Already known signaling procedures can be used for this purpose.

The invention makes it possible, simply and reliably, to identify whether or not there are any mobile radio terminals that are not switched off in an area to be monitored, and allows appropriate measures to be taken to protect a limited local area against electromagnetic radiation.

Mobile radio terminals also exist which interchange information with the mobile radio system at specific time intervals even in the standby mode. For the purposes of this application, switching off thus also means that the mobile radio terminal is switched to a state in which it can no longer emit any signals which could lead to significant interference with other electronic equipment.

In accordance with an added feature of the invention, the processing step comprises displaying information about the mobile radio terminals that are not switched off.

In accordance with an additional feature of the invention, the emitting step comprises emitting with the transmitting device a plurality of different signaling information items corresponding to different mobile radio systems, and the receiving step comprises receiving with the receiving device a plurality of different signaling information items corresponding to different mobile radio systems.

In other words, the radio station is operated at least partially on the principle of a base transmitting/receiving station for different mobile radio systems.

This means that the invention may be used in different countries, and mobile radio terminals of all persons and of the corresponding different mobile radio systems can be detected in monitoring areas which are generally entered by an international population (airports).

In accordance with another feature of the invention, the transmitting device transmits, after a fixed or variable time interval, signaling information about a changed location area associated with the transmitting device.

It is thus possible even for a mobile radio terminal which has already been detected and is switched on again after having first been switched off to emit signaling information relating to the change in the location area.

In accordance with a further feature of the invention, the transmitting device and/or the receiving device is/are not connected to switching centers.

Advantageously, the radio station operates at least partially on the principle of a base transmitting/receiving station of a mobile radio system that is not to be connected to switching centers. This means that the radio station can be designed to be technically very simple, cheap, and even to be portable.

In accordance with again an added feature of the invention, the transmitting device and the receiving device are integrated in a base transmitting/receiving station which at least partially operates on a principle of different mobile radio systems.

In accordance with again an additional feature of the invention, the signaling information emitted by the transmitting device is received only with those mobile radio terminals that have a specific physical relationship with the transmitting device.

This has the advantage that the only mobile radio terminals which are detected are those located in the area monitored by the invention.

In accordance with again another feature of the invention, the method further comprises:

causing with the processing of the second signaling information an emission of third signaling information via a radio interface using the principle of a mobile radio channel;

receiving the third signaling information with a mobile radio terminal; and processing the third signaling information with programmable processor devices, and deactivating at least one transmission function of the mobile radio terminal.

In accordance with again a further feature of the invention, signaling information is transmitted for deactivating a transmission function after a first signaling phase of setting up a connection.

In accordance with yet again a further feature of the invention, the mobile radio terminal is placed into a state in which at least one transmission function is deactivated, and it can no longer be activated as long as the mobile radio terminal is in the state.

With the above and other objects in view there is also provided, in accordance with the invention, a radio station, comprising:

a transmitting device for transmitting signaling information over a location area, wherein the signaling information is not emitted at the same time by an adjacent base transmitting/ receiving station, and wherein a reception and processing of the signaling information in a mobile radio terminal leads to the emission of second signaling information;

a receiving device for receiving the second signaling information transmitted by the mobile radio terminals for updating the location area;

a processing device connected to the receiving device for processing the second signaling information; and a display device connected to the processing device for displaying information about mobile radio terminals in the location area that are not switched off.

In accordance with yet an added feature of the invention, the transmitting device is adapted to emit, after a fixed or variable time interval, changing signaling information over a location area.

In accordance with yet an additional feature of the invention, the radio station is not connected to a switching center.

In accordance with yet another feature of the invention, the transmitting device, the receiving device, and the processing device are designed to process signaling information for different mobile radio systems.

With the above and other objects in view there is also provided, in accordance with a concomitant feature of the invention, a mobile radio terminal, comprising:

a receiving device for receiving signaling information;

programmable processor devices connected to the receiving device for processing the signaling information; and means for deactivating at least one transmission function of the mobile radio terminal as a function of the received and processed signaling information.

In another, above-mentioned refinement of the invention, signaling information is emitted by a radio station via a radio interface, which signaling information is received and processed by a mobile radio terminal, and this process leads to deactivation of a transmission function of the mobile radio terminal.

This means that the handling of mobile radio terminals is limited automatically, reliably and efficiently to those functions which cause no interference with the environment. It is no longer required that the apparatus is manual switched off.

Other features which are considered as characteristic for the invention are set forth in the appended claims.

Although the invention is illustrated and described herein as embodied in a method for protection of a limited local area against electromagnetic radiation emitted by mobile radio terminals, a radio station and a mobile radio terminal, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
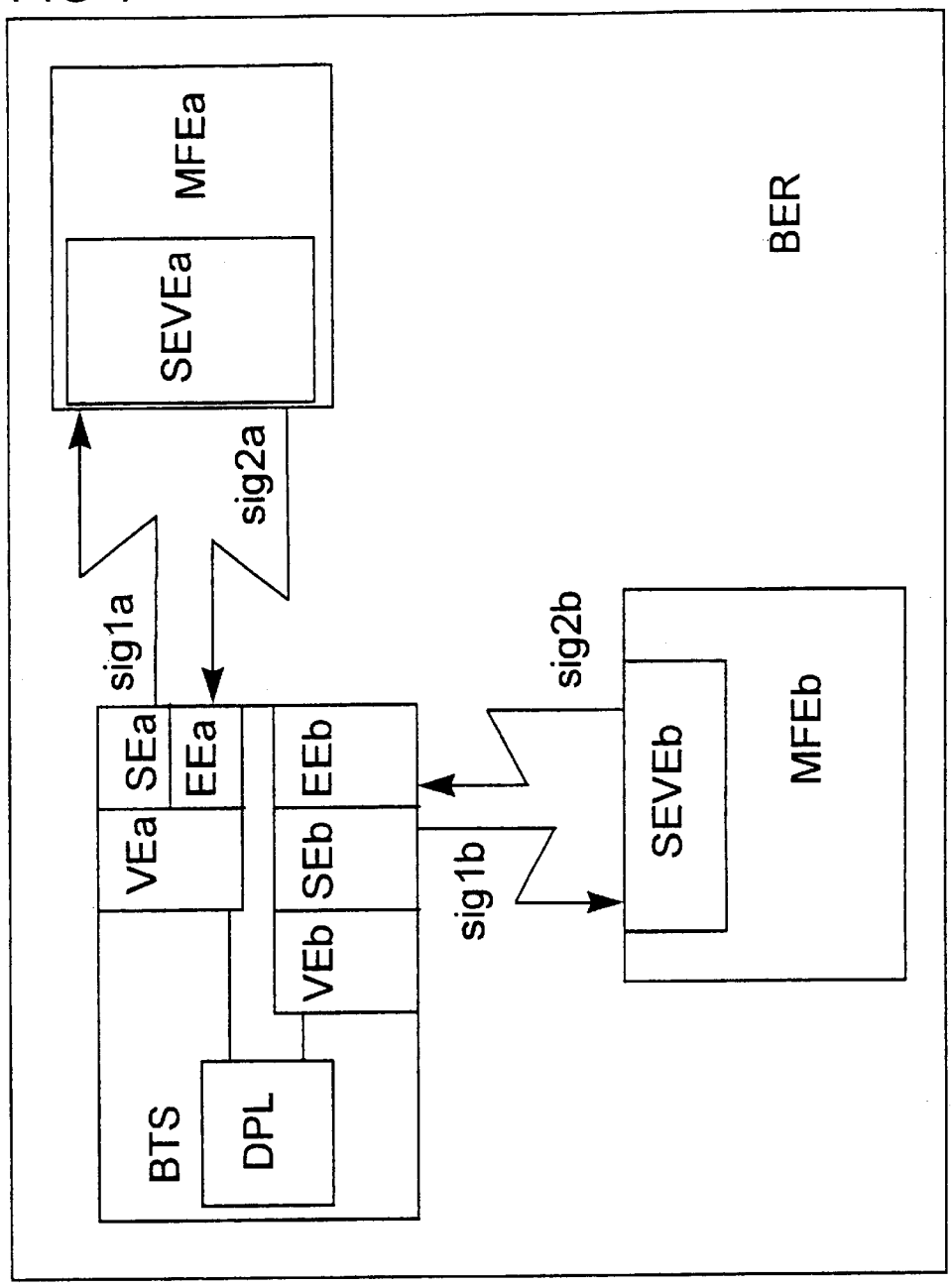
FIG. 1 is a schematic illustration of various mobile radio terminals, and a radio station.
Figure 1:
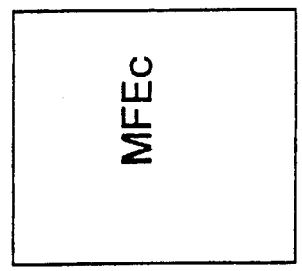

Referring now to the figures of the drawing in detail and first, particularly, to FIG. 1 thereof, there is shown a radio station BTS (base terminal station) having transmitting units SE, receiving units EE, and processing units VE for different mobile radio systems.

The radio station BTS emits signaling information sig1, which can be received and processed by mobile radio terminals MFEa, MFEb within a limited local area BER which may be governed by the range of the transmitted signals.

The term "mobile radio terminal" in this case also means mobile telephones or portable computers which are adapted to emit radio-frequency electromagnetic waves via a radio interface and can in this way communicate via a mobile radio system.

The invention may most advantageously be used in the following areas BER:

in aircraft and at airports;

in hospitals, medical practices and medical laboratories;

in the vicinity of fuel dumps and gas stations; and in the vicinity of chemical works or close to operations involving explosives.

The size of the area BER covered may be varied and adapted by regulating the power of the transmitted signals or via a suitable antenna configuration by means of which the signaling information is transmitted.

Mobile radio terminals MFEc which are located outside the area BER cannot receive the signaling information.

Since no normal service, such as telephoning, is intended to be enabled via the radio station BTS that is not connected to a switching device of a mobile radio system, this radio station BTS may be designed to be technically simpler than a base transmitting/receiving station which is connected to a mobile radio system. It may thus even be a radio station BTS which operates only partially on the principle of a base transmitting/receiving station for mobile radio systems. It is also possible to use base transmitting/receiving stations which differ from the normally used base transmitting/receiving stations only in the processing of the information.

The signaling information sig1, sig2 is in this case transmitted via the interfaces or mobile radio channels, which are known and are already present, in accordance with the standards for different mobile radio systems.

The signaling information sig1a, sig1b is received and further processed by the mobile radio terminals MFEa, MFEb within the area BER by means of transmitting, receiving and processing devices SEVEa, SEVEb. The signaling information sig1 may be processed by software-controlled processors contained in the mobile radio terminals MFE. The further processing of the signaling information sig1 leads to a receiving mobile radio terminal MFE itself emitting signaling information sig2 as a response to the received signaling information.

The reception and the processing of the signaling information sig2 (transmitted by the mobile radio terminals) in the radio station BTS leads, for example, to someone who is monitoring or controlling the process being informed visually by a monitor DPL or audibly via a loudspeaker of the fact that mobile radio terminals MFEa, MFEb are still switched on in the monitored area. If required, information may also be displayed about the number of mobile radio terminals MFEa, MFEb which are still switched on.

This means that the radio station BTS acts as a detector which actively requires the mobile radio terminals MFEa, MFEb to be detected to transmit a response signal sig2. With the method according to the invention, it is not necessary to wait for a signal which happens to be emitted by the mobile radio terminal MFE on the basis of a continually repeated process for information interchange with the base transmitting/ receiving station, or on the basis of a connection being set up. Instead of this, the method according to the invention forces detectable signals sig2 to be emitted at a defined time by all those mobile radio terminals MFEa, MFEb which are switched on in the monitored area BER.

In one advantageous embodiment of the invention, a radio station BTS is installed in the geographical area to be monitored (for example close to the entrance of an aircraft or in an aircraft). That radio station BTS operates at least partially on the principle of a base transmitting/receiving station BTS for one or more mobile radio standards (for example GSM and/or PCN and/or DCS and/or IS-95 AMPS and/or TACS and/or IS-54 and/or PDC and/or CDMA and/or WB-CDMA and/or TD/CDMA etc.). To do this, the mobile radio station BTS may be provided with different transmitting SEa, SEb receiving EEa, EEb processing devices VEa, VEb which are appropriate for the respective mobile radio systems.

A further refinement of the invention provides for an individual radio station BTS, which does not communicate with a mobile radio system, to transmit its identification sig1a on signaling channels such as the GSM system BCCH (Broadcast Control Channel) with a location identification (information over the location area) that is not used by the adjacent base transmitting/receiving stations, such as the LAI (Location Area Identity) in the GSM system.

In order to force the mobile radio terminals MFEa, MFEb in the monitored area BER to carry out an interchange (Location Update) with the associated base transmitting/ receiving station and/or the associated location identification (LAI Location Area Identity), the radio station BTS transmits signaling information sig1 of very high quality and at high power.

Since the signaling information sig1 emitted by the radio station BTS can also be received with better quality by the mobile radio terminals MFEa, MFEb owing to the immediate proximity to the mobile radio terminals MFEa, MFEb than the signals transmitted by the possibly adjacent base transmitting/receiving stations, those mobile radio terminals MFEa, MFEb which are not switched off transmit a measurement report to the radio station BTS, as well as the signaling information sig2a required for an interchange (Location Update) with the associated base transmitting/ receiving station and the associated location identification (LAI, Location Area Identity).

The mobile radio terminals MFEa, MFEb are logged off from the mobile radio system and are logged on in the vertical cell of a virtual mobile radio system which is associated with the radio station BTS. Such a virtual mobile radio cell also circumvents any inhibitions in the access to the real mobile radio system.

The reception and processing of the signaling information sig2 required for the location update leads to the triggering of a visual or audible production of a warning signal in the radio station BTS or in an output device DPL associated with the radio station. If the mobile radio terminals MFEa, MFEb are not switched off after appropriate information to the operator, then the process can be repeated after changing the LAI (Location Area Identity) code to be transmitted by the radio station BTS, and the detection of mobile radio terminals which have not yet been switched off or have been switched on again can be continued. A person skilled in the art can find the detailed description and definition of the signaling procedures used for a location update in the known standard descriptions of corresponding mobile radio systems.

Figure 2:
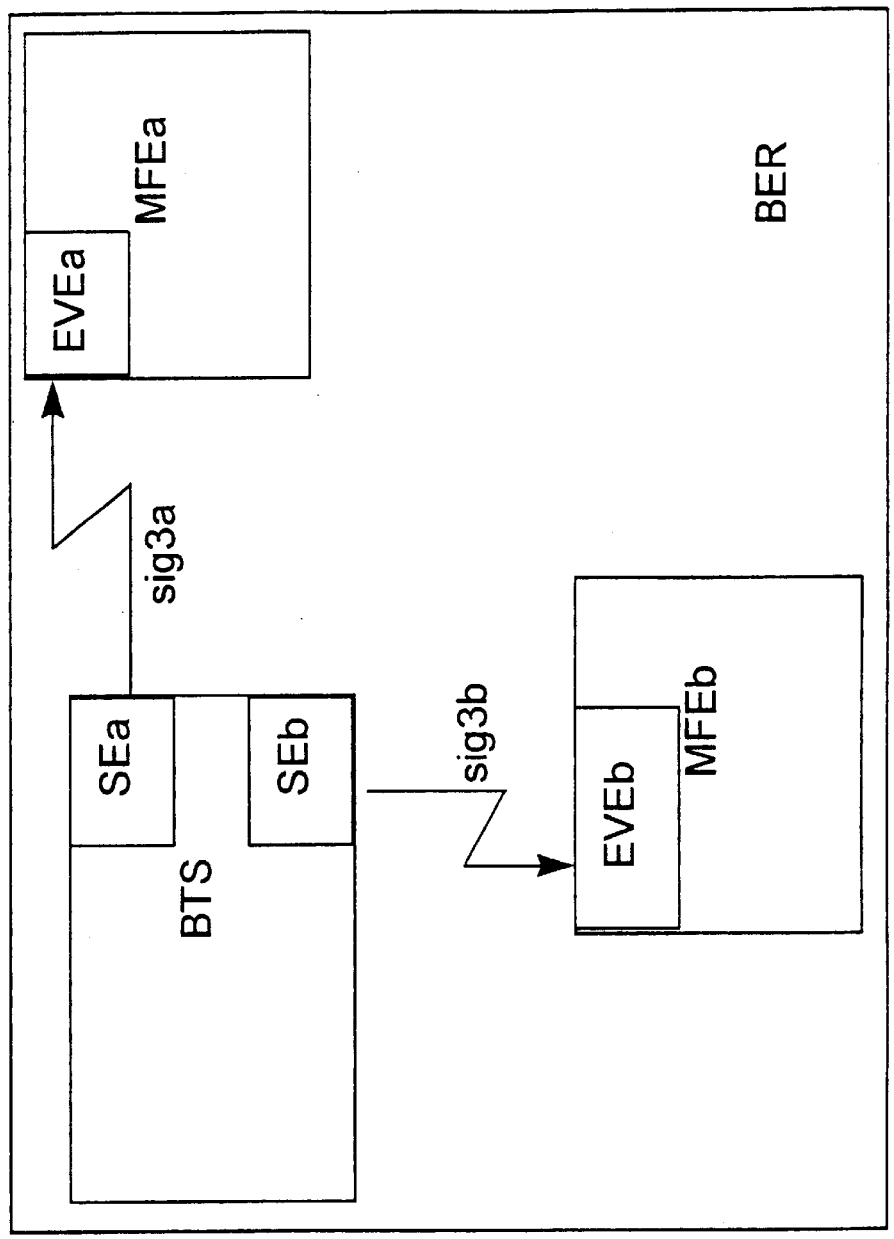
FIG. 2 is a schematic illustration of mobile radio terminals, a radio station, and the transmission of signaling information in accordance with the invention.
Figure 2:
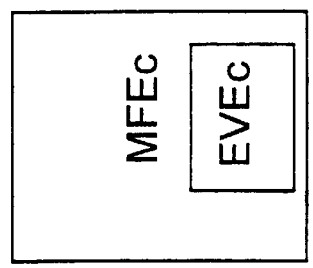

FIG. 2 shows a radio station BTS which, after reception and processing of the signaling information sig2 required for the location update described above, transmits signaling information sig3 within a limited local area BER. The signaling information sig3 can be received and processed by mobile radio terminals MFEa, MFEb using appropriate receiving and processing devices EVE.

The signaling information sig3 may in this case be transmitted via the mobile radio system interfaces or mobile radio channels which are known and are already present, or via interfaces provided and defined specifically for this purpose.

The signaling information sig3 is received and further processed by those mobile radio terminals MFEa, MFEb within the area BER which are on standby. This may be done by software-controlled processors, which may already be present in any case.

The further processing of the information leads to specific functions in the mobile radio terminals MFEa, MFEb being deactivated. These are advantageously those functions which can lead to interference in the vicinity of these mobile radio terminals. The transmission functions or the transmitting and receiving functions are thus deactivated, depending on the level of interference. With portable computers as well, those functions are deactivated which lead to the emission of radio-frequency signals or high-power signals. "Deactivation of functions" also means that these functions can no longer be carried out for a fixed or variable time period, or until the system, some other electronic equipment or the user issues a command to cancel the deactivated state. Deactivation of a transmission function may also mean that the mobile radio terminal is switched to a state in which it can no longer emit any signals which could lead to significant interference with other electronic equipment.

The further processing of the information may also lead to the mobile radio terminal MFEa, MFEb being switched to a state in which these specific functions are deactivated, and for it to be impossible to activate these functions for as long as the mobile radio terminal is in this state. This could also be achieved by the radio station BTS being integrated in a type of door frame, gate, barrier, or some other means for limiting access, and by addressing those mobile radio terminals MFE which are moved through this means for limiting access. The previously deactivated functions are activated again only when the mobile radio terminal MFEa, MFEb is moved through these access limiting means for a second time.

This radio station BTS is configured such that all the mobile telephones MFEa, MFEb located in the relatively immediate vicinity BER select this radio station as the associated base transmitting/receiving station (serving cell). To do this, this radio station BTS transmits at particularly high power.

The mobile stations MFEa, MFEb which are located within the area BER are forced to switch themselves off by a defined command sig3 or a defined message sig3 from the radio station BTS to the mobile telephone MFEa, MFEb. Even if the mobile telephone is switched on again by the user, it is once more switched off by command. Depending on the configuration, the switch-off command may be a special message or a special parameter/parameter set in a more general message.

Depending on the mobile radio standard to be supported, it may also be possible to continue to allow the mobile telephone to access the communication network during reception (for example of broadcast messages) only, that is to say to prevent the mobile telephone from transmitting.

For this purpose, the mobile radio system and/or the communication protocol in question may be upgraded by an appropriate switch-off command. It is also possible for only the mobile telephones and/or their control software to be upgraded in such a manner that the processing of the switch-off command leads to deactivation of the corresponding functions.

A further option for carrying out the method according to the invention is for the radio station BTS to follow a first signaling phase with the purpose of setting up a connection by transmitting signaling information sig3 whose processing in the mobile radio terminal MFEa, MFEb leads to deactivation of the transmission function.

The following signaling phase is normally carried out in order to set up a connection in mobile radio systems:
  the mobile radio terminal MFEa, MFEb transmits a channel request signal to the radio station BTS
  the radio station BTS transmits an immediate assignment signal to the mobile radio terminal MFEa, MFEb
  the mobile radio terminal MFEa, MFEb transmits a location updating request signal to the radio station BTS.
This is now followed by a further step:
  the radio station BTS transmits a switch-off command sig3 to the mobile radio terminal MFEa, MFEb.

The processing of the switch-off command sig3 leads to specific functions, such as the transmission function, being deactivated in the mobile radio terminal MFEa, MFEb.

Figure 3:
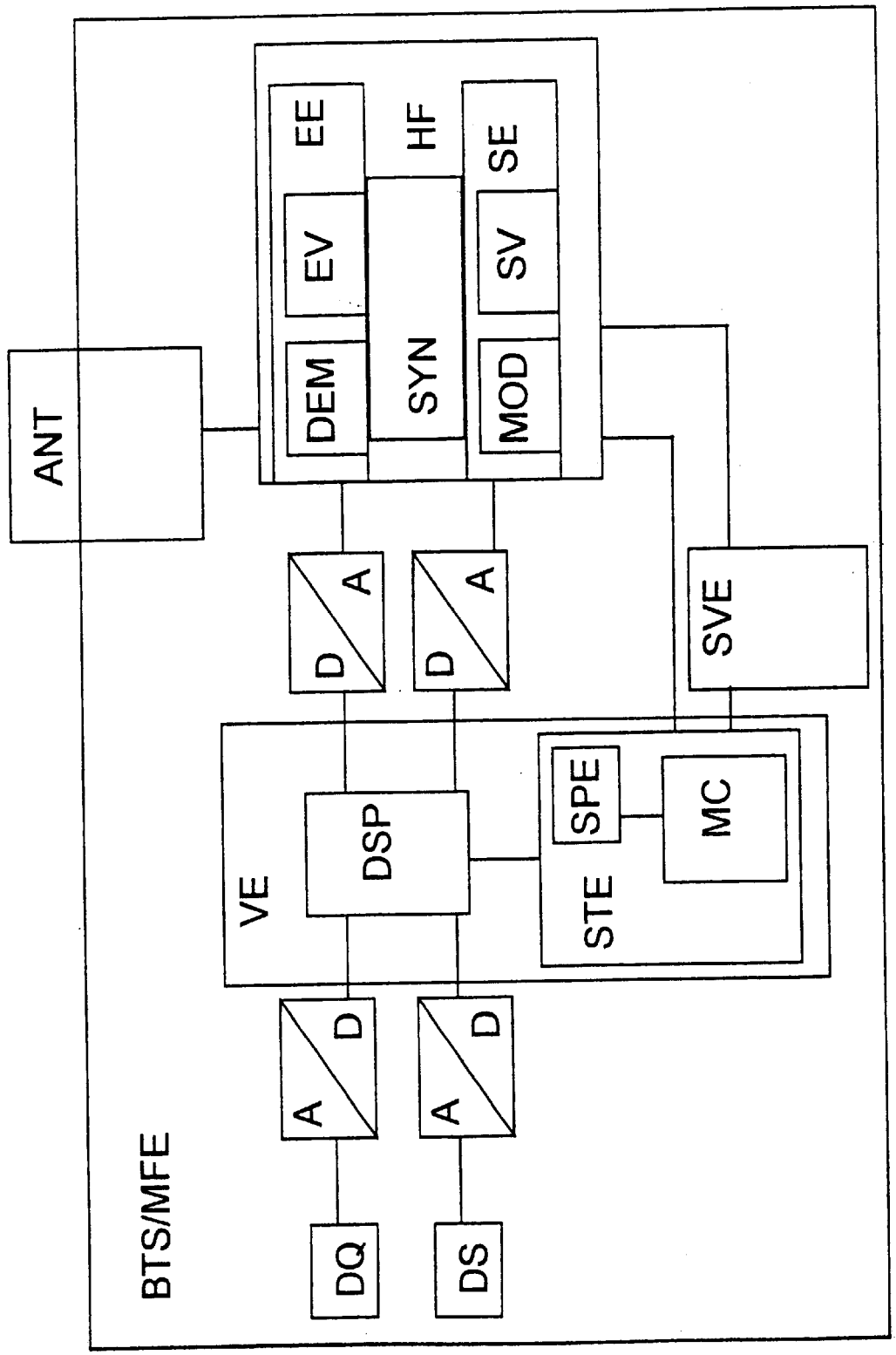
FIG. 3 shows a schematic illustration of a radio set.

FIG. 3 shows a radio, which may be a radio station BTS or a mobile station MFEa, MFEb. If it is a mobile radio terminal MFE, it comprises a microphone and a loudspeaker element. If it is a radio station BTS which is not connected to any switching center, these elements are missing; on the other hand, the radio station BTS may be provided with a display to indicate the detection results.

Apart from this, a processing device VE, which may also comprise a control device STE or may be formed separately from it, a power supply device SVE, a radio-frequency device HF (comprising a receiving device EE, a transmitting device SE and a frequency synthesizer SYN) and an antenna device ANT are provided. The individual elements of the radio are also connected to one another by conductor paths or bus systems.

The control device STE essentially comprises a programmable processor device, such as a microcontroller MC, and the processing device VE comprises a digital signal processor DSP both of which have write and read access to memory modules SPE. The microcontroller MC controls and monitors all the major elements and functions of the radio, and controls the communication and signaling sequences, switching on and off as well as activation and deactivation of specific components or functions of the radio, the switching of the radio to specific operating modes, and the identification and determination of the transmission conditions on the links between the mobile station and the base station.

The volatile or non-volatile memory modules SPE are used to store program data which is required to control the radio and the communication sequence, in particular including the signaling procedures as well, equipment information, information entered by the user, information arising during the processing of signals and, in particular, reception power threshold values to identify extraordinary transmission conditions, as well.

The digital signal processor DSP is responsible for the voice and channel coding of the data to be transmitted and the received data.

Analog/digital converters A/D are used to convert the analog audio signals and the analog signals originating from the radio-frequency device HF into digital signals, which are processed by the digital signal processor DSP. Data to be transmitted may be spread using a connection-specific spread code, may be modulated by a modulator MOD, amplified by a transmission power amplifier SV and, finally, emitted with the appropriate transmission power via the antenna ANT. At the receiving end, the radio signals are received by the antenna ANT with a reception power level, are amplified by a reception amplifier EV, are demodulated by a demodulator DEM, are despread if appropriate, and are finally detected by the processing device VE.

The person skilled in the art may easily deduce further combinations of the exemplary embodiments described above from the present description, in particular radio stations BTS which can communicate in accordance with the mobile radio standards of different mobile radio systems.

We claim:

1. A method of protecting a limited local area against electromagnetic radiation emitted by mobile radio terminals, which comprises:

emitting signaling information with a stationary transmitting device about a location area associated with the transmitting device;

causing, upon a reception and processing in a mobile radio terminal, an emission of second signaling information for updating the location area of the mobile radio terminal;

receiving the second signaling information with a stationary receiving device; and processing the second signaling information for detecting mobile radio terminals that are not switched off.

2. The method according to claim 1, wherein the processing step comprises displaying information about the mobile radio terminals that are not switched off.

3. The method according to claim 1, wherein the emitting step comprises emitting with the transmitting device a plurality of different signaling information items corresponding to different mobile radio systems, and the receiving step comprises receiving with the receiving device a plurality of different signaling information items corresponding to different mobile radio systems.

4. The method according to claim 1, which comprises, after a given time interval, transmitting with the transmitting device signaling information about a changed location area associated with the transmitting device.

5. The method according to claim 1, wherein the given time interval is a fixed time interval.

6. The method according to claim 1, wherein the given time interval is a variable time interval.

7. The method according to claim 1, wherein the emitting step comprises emitting signaling information with a transmitting device not connected to a switching center.

8. The method according to claim 1, wherein the receiving step comprises receiving with a receiving device not connected to a switching center.

9. The method according to claim 1, wherein the transmitting device and the receiving device are integrated in a base transmitting/receiving station which at least partially operates on a principle of different mobile radio systems.

10. The method according to claim 1, which comprises receiving the signaling information emitted by the transmitting device only with those mobile radio terminals having a specific physical relationship with the transmitting device.

11. The method according to claim 1, which comprises:

causing with the processing of the second signaling information an emission of third signaling information via a radio interface using the principle of a mobile radio channel;

receiving the third signaling information with a mobile radio terminal; and processing the third signaling information with programmable processor devices, and deactivating at least one transmission function of the mobile radio terminal.

12. The method according to claim 1, which comprises transmitting the signaling information for deactivating a transmission function after a first signaling phase of setting up a connection.

13. The method according to claim 1, wherein the step of processing the signal information comprises placing the mobile radio terminal into a state in which at least one transmission function is deactivated, and can no longer be activated as long as the mobile radio terminal is in the state.

14. A radio station, comprising:

a stationary transmitting device for transmitting signaling information about a location area associated therewith, wherein the signaling information is not emitted at the same time by an adjacent base transmitting/receiving station, and wherein a reception and processing of the signaling information in a mobile radio terminal within the location area leads to an emission of second signaling information;

a stationary receiving device for receiving the second signaling information transmitted by the mobile radio terminal for updating the location area;

a processing device connected to said receiving device for processing the second signaling information; and a display device connected to said processing device for displaying information about mobile radio terminals in the location area that are not switched off.

15. The radio station according to claim 14, wherein said transmitting device is adapted to emit, after a fixed or variable time interval, changing signaling information over a location area.

16. The radio station according to claim 14, wherein the radio station is not connected to a switching center.

17. The radio station according to claim 14, wherein said transmitting device, said receiving device, and said processing device are adapted to process signaling information for different mobile radio systems.

* * * * *

UNITED STATES PATENT AND TRADEMARK OFFICE
CERTIFICATE OF CORRECTION

PATENT NO. : 6,745,037 B1
DATED : June 1, 2004
INVENTOR(S) : Peter Neumann et al.

It is certified that error appears in the above-identified patent and that said Letters Patent is hereby corrected as shown below:

<u>Title page,</u>
Item [63], Related U.S. Application Data, should read as follows:
-- Continuation of application No. PCT/DE98/02631, filed on Sep. 7, 1998. --

Signed and Sealed this

Third Day of August, 2004

JON W. DUDAS
*Acting Director of the United States Patent and Trademark Office*